United States Patent [19]

Hicks

[11] 4,086,154
[45] Apr. 25, 1978

[54] APPARATUS FOR DETERMINING STRESS IN AN ELECTRODEPOSIT

[75] Inventor: Harry C. Hicks, Puyallup, Wash.

[73] Assignee: The Boeing Company, Seattle, Wash.

[21] Appl. No.: 708,401

[22] Filed: Jul. 26, 1976

[51] Int. Cl.² .............................................. G01L 1/00
[52] U.S. Cl. .............................. 204/195 R; 73/88 R; 73/150 R; 204/228
[58] Field of Search .......................... 73/88 R, 150 R; 204/1 T, 195 R, 228

[56] References Cited

U.S. PATENT DOCUMENTS

| 2,568,713 | 9/1951 | Brenner | 73/150 R |
| 2,829,517 | 4/1958 | Kushner | 73/150 R |
| 3,356,597 | 12/1967 | Schmidt | 204/1 T |
| 3,437,568 | 4/1969 | Hasselmann et al. | 204/3 |

OTHER PUBLICATIONS

F. B. Koch et al., Plating & Surface Finishing, vol. 63, No. 1, pp. 46-51, (1976).

Primary Examiner—G. L. Kaplan
Attorney, Agent, or Firm—Christensen, O'Connor, Johnson & Kindness

[57] ABSTRACT

Apparatus for determining the internal stress within electrodeposited metals is disclosed. The apparatus includes an improved spiral contractometer wherein the spiral substrate is coupled directly to a dial indicator without the use of a gear system. A rod, passing between the dial indicator and the lower end of the spiral substrate, causes a dial indication for changes in the radius of curvature of the spiral substrate. To determine the internal stress that is created within metal electrodeposited from a particular electrolytic plating solution, the spiral contractometer is submersed in that plating solution and connected as the cathode of a galvanic cell. An anode, consisting of the type of metal being electrodeposited, is supported in a precise position relative to the spiral substrate and a constant current is supplied between the anode and the spiral contractometer for a precise period of time to electrodeposit a controlled amount of metal on the spiral substrate. At the conclusion of the electrodeposition period, the deflection of the spiral contractometer is read on a vernier readout of the dial indicator and referenced to a calibration curve or multiplied by a known factor to provide the internal stress of the electrodeposited metal. Because the improved spiral contractometer is relatively free of frictional forces that change with time and a controlled amount of metal is deposited on the spiral substrate, the contractometer need not be calibrated prior to each use but is generally calibrated only when it is necessary to replace the spiral substrate.

9 Claims, 3 Drawing Figures

APPARATUS FOR DETERMINING STRESS IN AN ELECTRODEPOSIT

BACKGROUND OF THE INVENTION

This invention relates to improved apparatus for the examination and evaluation of the process of electrodeposition. More particularly, this invention relates to apparatus for determining the internal stress within electrodeposited metals.

The electrodeposition of metal is utilized both in the field of electroplating wherein a layer of metal is electrolytically deposited on the surface of a metal part and in the field of electroforming wherein a part is formed by electrolytically depositing metal on a mandrel or base and then separating the deposited metal from the mandrel. In either case, it is well known that stress is created within the deposited metal, with such stress being either compressive or tensile. The type of stress encountered (compressive or tensile) and the magnitude of the stress is a function of the composition of the solution used in the electrodeposition process (e.g., the major constituents of the electrolytic plating solution, additives such as wetting agents, and metallic and organic impurities finding their way into the plating solution), and is further dependent on the solution temperature, the current density utilized during the electrodeposition process, and the agitation used while the electrodeposition is taking place. In electrodepositing nickel for example, commercially electroformed parts typically have an internal stress of 2,000–5,000 psi (approximately 14 to 35 meganewtons/meter$^2$) with stress exceeding 10,000 psi (69 MN/m$^2$) being encountered if the electroforming process is not carefully controlled.

With respect to electroplating, such internal or "residual" stress can cause appearance defects such as small cracks and blemishes and can cause the electroplate to become less corrosion resistant. With respect to electroformed parts, residual stress is of even greater importance since it can cause structural failure of the electroformed part. In particular, electroforming is often used to produce parts having precise dimensional tolerances with such parts often having regions of relatively thin cross sectional area. If the plating process causes high residual stress in such parts, the parts may crack or may deform such that the parts do not comply with the required dimensional tolerances. Further, in situations wherein the electroformed parts are intended for use at an elevated temperature, or intended for cyclic operation over a substantial temperature range, such deformation or cracking may not be evidenced until the electroformed parts have been placed in service.

Because of the serious effects that can result from residual stress, the measurement of residual stress is important in both the process of electroplating and electroforming. In particular, measuring residual stress is important in establishing basic electrodeposition parameters such as the current density to be employed in a production electrodeposition process and is further important in periodically determining the condition of the electrodeposition solution when such solution is repetitively used. Such periodic testing of the electrodeposition solution, or electrolyte, is necessary since the production of electroplated or electrodeposited parts is generally a "batch" process wherein a large number of parts are simultaneously electrodeposited in a substantial volume of electrolytic solution, and the residual stress of the electrodeposits formed within such a solution continually increases as the solution is repeatedly used. The increase in residual stress from one bath of electrodeposited parts to the next is primarily caused by an increase in the level of contaminants within the electrolytic solution, with such increase in contaminant concentration being caused by a number of factors such as impurities released from the metal anodes as the anodes are depleted to supply metal ions to the electrolytic solution, and impurities that are introduced into the electrolytic solution by pressurized air that is commonly injected into the electrolytic solution to provide agitation.

Due to the relatively large volume of electrolytic solution utilized in a production electrodeposition process it is both wasteful and costly to prematurely replace or replenish the electrolytic solution. Further, since the electrodeposition process must be conducted with the electrolytic solution at a relatively constant elevated temperature, such replenishment or replacement causes interruptions in the production process. On the other hand, since a large number of parts are simultaneously electrodeposited in each production operation, and such production operation requires the expenditure of a substantial amount of time and material, it is both wasteful and costly to continue the production operation until the residual stress within at least one batch of the produced parts exceeds the desired limits. Accordingly, it can be recognized that apparatus for rapidly determining the residual stress that will result during the next ensuing production process is highly desirable. With such an apparatus, the condition of the electrolytic solution can be periodically monitored with little interruption of the production process and the electrolytic solution replaced or replenished only when necessary.

The most widely used prior art instrument for determining the residual stress of electrodeposits is an apparatus commonly called the Brenner-Senderoff contractometer which is described in U.S. Pat. No. 2,568,713 issued to Abner Brenner. In the Brenner-Senderoff contractometer, a cylindrical substrate comprising a spiral-wound strip of metal, sometime called a helix, extends downwardly into the plating solution to be tested with the spiral-wound substrate or helix electrically connected to serve as a cathode of a galvanic plating cell. The upper end of the helix is securely clamped to a support plate, and the lower region of the helix is rigidly clamped to a circular plug. A rod extends upwardly through the interior region of the helix with the lower end of the rod connected to the center of the circular plug and the upper end of the rod extends through the support plate. As metal is electrodeposited on the outer surface of the helix, the stress within the electrodeposit causes changes in the radius of curvature of the helix, i.e., the helix attempts to wind or unwind, and hence causes the rod to rotate. In particular, the helix unwinds under the influence of tensile stress within the electrodeposit to rotate the rod in one direction and the helix winds up under the influence of compressive stress to rotate the rod in the opposite direction.

To provide an indication of the magnitude of the stress, the upper terminus of the rod is affixed to a segmental gear which meshes with a pinion that is equipped with a pointer. As the rod rotates, the gear system provides a tenfold amplification of the angular displacement of the rod and the pointer moves across a calibrated disc that is mounted beneath the pointer. A particular angular deflection, as indicated by the pointer and the graduations of the calibrated disc, can be converted to a stress measurement by a series of mathematical calculations involving the characteristics of the particular helix employed, the type of metal being electrodeposited, and the amount of metal deposited during the test.

Although the Brenner-Senderoff contractometer provides generally satisfactory results, certain disadvantages are associated with its use, especially its use in a production environment. First, the determination of residual stress with the Brenner-Senderoff contractometer is a rather time-consuming process, often requiring 4 or 5 hours for the necessary calibration of the device, electrodepositing metal on the contractometer helix, determining the amount of metal deposited, and performing approximately 20 calculations to convert the resulting dial reading to the stress within the electrodeposit. Such a lengthy testing procedure is not advantageous in the efficient electroplating or electroforming of production parts. Further, since the stress within the electrodeposit is a rather strong function of temperature, it is often difficult to ensure that the temperature of the electrolytic solution of interest remains constant through both the testing procedure and through any ensuing production of parts.

Secondly, the mathematical calculations necessary during the calibration of the contractometer and the determination of the stress from the dial indication are often not easily understood or accomplished by personnel trained in production electroplating or electroforming operations. Largely because of the complexity of the mathematical calculations and the time required to conduct a stress measurement, the Brenner-Senderoff contractometer has been considered by many to be a laboratory instrument and not suited for use in a production plating environment.

Thirdly, use of the prior art contractometer is somewhat limited in that certain measurement inaccuracies occur and it is often difficult to obtain the same stress measurement when two samples of the same electrolytic solution are tested under seemingly identical conditions. These inaccuracies occur largely because of friction within the contractometer gear mechanism and dial pointer. Since the torque caused by a particular electrodeposited sample is often on the order of 10 grams-centimeters, rather small frictional forces or binding in the dial mechanism will cause substantial error. Even though it has become accepted practice to tap the contractometer to eliminate possible binding, and to utilize jeweled bearings without a lubricant to minimize friction, such errors are often encountered. In particular, although the prior art contractometer is generally recalibrated with each use, changes in frictional forces within the dial assembly have been found to cause variations in test results that exceed 10% when the same electrolytic solution is tested under identical test conditions.

Accordingly, it is an object of this invention to provide apparatus for rapidly determining the residual stress created within electrodeposits formed within a particular electrolytic solution.

It is another object of this invention to provide apparatus for determining stress within an electrodeposit that is amenable to use within either a test laboratory or a production shop.

It is yet another object of this invention to provide a spiral contractometer and associated apparatus for determining residual stress within electrodeposited metal without requiring a determination of the amount of electrodeposit or lengthy mathematical calculations.

It is still another object of this invention to provide a spiral contractometer for measuring residual stress within electrodeposited metals wherein the contractometer does not require a gear driven dial indicator.

SUMMARY OF THE INVENTION

These and other objects are achieved in accordance with this invention by an improved spiral contractometer wherein the rod that transmits the torque caused by residual stress within metal electrodeposited on the contractometer spiral is directly coupled to a dial indicator having a vernier readout mechanism. To effect relatively low friction between the rod and an upper support member, the rod is supported solely by the connection between the rod and the spiral substrate and passes through a low-friction bearing located in the upper support plate. Preferably, this bearing is formed of a fluorocarbon material.

In accordance with this invention, a predetermined amount of electrodeposit is formed on the exterior surface of the contractometer spiral substrate by connecting the contractometer as the cathode of an electrodeposition test cell containing a quantity of the electrolytic solution to be tested. The amount of the electrodeposit formed during the test operation is controlled by a constant current source connected between the spiral substrate and the anode of the electrodeposition cell, with a precision timer being utilized to control the electrodeposition period. Preferably, the material forming the anode of the plating cell is placed in an annular metal basket that coaxially surrounds the contractometer spiral substrate. Additionally, the spiral substrate is connected to the upper contractometer support plate, and is connected to the rod that transmits the stress induced torque to the dial indicator, without the use of prior art clamps. Elimination of such clamps prevents errors that could result from the formation of electrodeposited metal on the clamping devices.

In the preferred embodiment, the contractometer is dimensioned and arranged to be supported from the rim of a conventional chemical beaker that forms the electrodeposition test cell. The anode of the test cell includes metal fragments of the type of metal being electrodeposited with the fragments being contained in an annular basket that coaxially surrounds the spiral substrate. With this arrangement, the beaker is placed on conventional heating apparatus for maintaining the electrolytic solution at a desired temperature and for agitating the electrolytic solution to ensure a uniform concentration and temperature within the electrolyte.

When the electrolyte is at the desired temperature, a timer is set to activate a constant current source that supplies the electrodeposition current between the annular anode and the spiral substrate. Since the current remains constant throughout the period of time in which the electrodeposition is formed on the spiral substrate, and the timer precisely controls the electrodeposition period, a controlled amount of electrodeposit is formed on the outer surface of the spiral substrate. Since the amount of electrodeposited metal is constant with each test operation, the prior art stress determination procedure is greatly simplified. In particular, neither the weight nor the thickness of the electrodeposited metal need be measured or calculated. Since the thickness of the electrodeposited metal is known prior to the test, the deflection of the dial indicator at the conclusion of the electrodeposition period is directly interpretable as a value of stress by reference to a simple calibration curve or by multiplying the dial reading by a single multiplicative factor.

Further, since the spiral substrate need not be removed from the contractometer for the prior art weighing operation, and since the directly driven dial indicator is not subject to mechanical binding or to frictional forces that can undergo substantial changes between test operations, the contractometer need not be calibrated prior to each test to determine the deflection constant of the spiral substrate. With respect to calibration, it has been determined that the apparatus of this invention need only be calibrated when the spiral substrate is replaced.

Although such calibration is performed in a manner similar to the calibration of the prior art Brenner-Senderoff contractometer, it has been determined that the prior art calibration technique, which provide only for angularly deflecting the spiral substrate in a manner corresponding to deflection caused by compressive residual stress, caused certain testing inaccuracies. In particular, it has been found that the deflection constant of a spiral substrate subjected to compressive stress of an electrodeposited metal is not identical to the deflection constant for electrodeposited metals exhibiting tensile stress. In this regard, the preferred embodiment of the invention includes a calibration arrangement for separately determining a first deflection constant that is associated with compressive stress and a second deflection constant that is associated with tensile stress.

By eliminating the need for calibrating the contractometer each time a stress test is conducted, and by eliminating the removal and weighing of the spiral substrate and the subsequent calculations necessitated by the prior art apparatus, the period of time required to determine the residual stress of an electrodeposit is reduced from the previous four or five hours to less than one hour. Further, since the electrodeposition process during the test interval need not be closely monitored and precise weighing and calculation procedures are not required, the test procedure can easily be accomplished by production plating personnel that are not normally trained in laboratory techniques.

BRIEF DESCRIPTION OF THE DRAWING

A better understanding of the present invention can be derived by reading the ensuing specification in conjunction with the accompanying drawing wherein.

DETAILED DESCRIPTION

Figure 1:
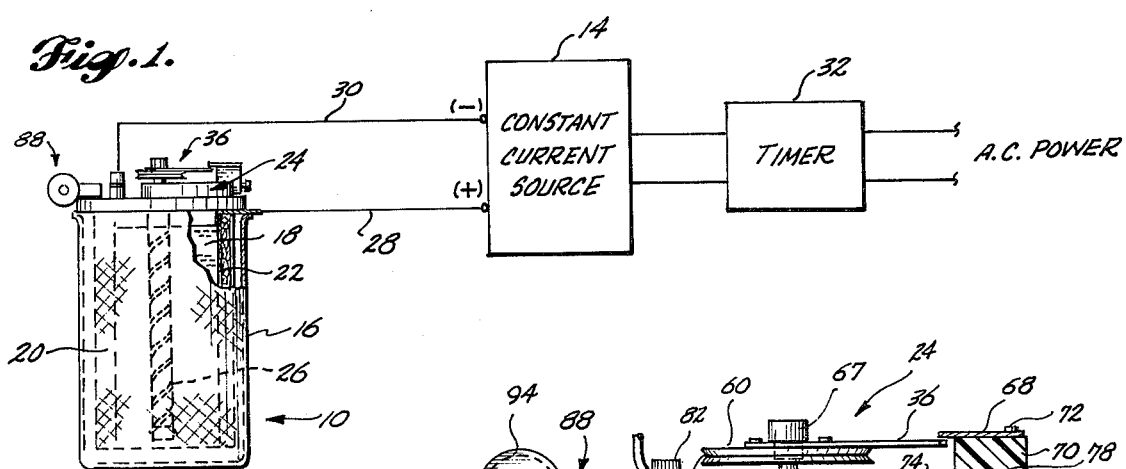
FIG. 1 is a partial pictorial, partial block diagram of a galvanic test cell equipped with an improved contractometer of this invention with the test cell being connected to a constant current source and timer for determining the residual stress of an electrodeposit in accordance with this invention.
Figure 2:
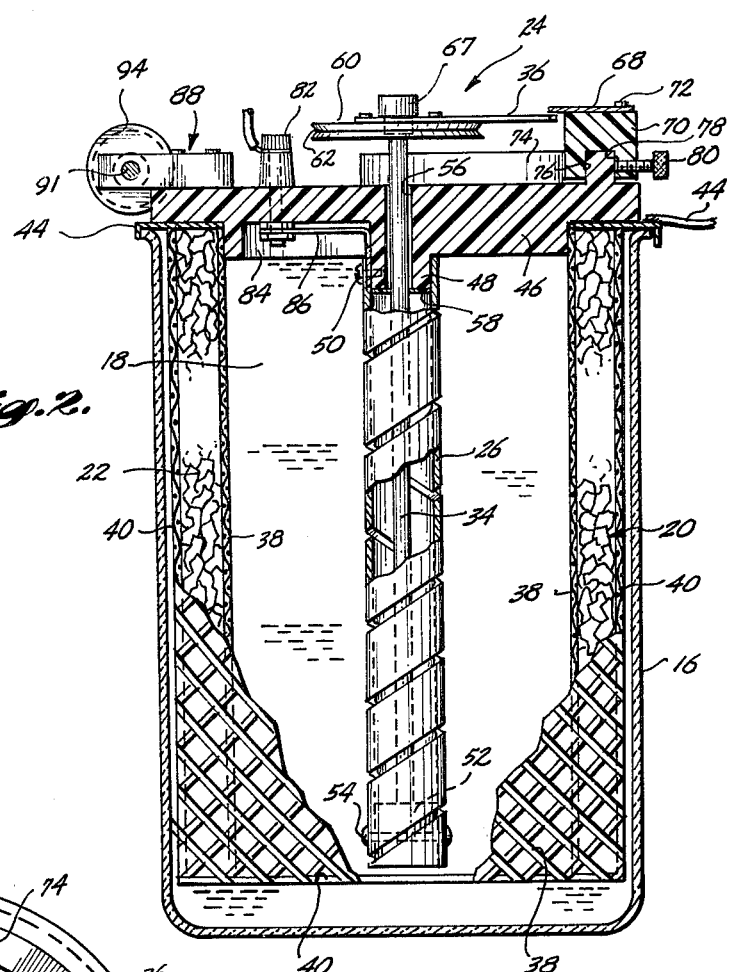
FIG. 2 is a side elevation view, in partial cross section, of the galvanic test cell and contractometer of this invention depicted in FIG. 1.

In FIG. 1 a galvanic test cell, generally denoted by the numeral 10, is electrically connected to a constant current source 14. As shown in FIGS. 1 and 2, the galvanic test cell 10 includes a conventional vessel 16, such as a chemical beaker, for containing a sample of the electrodeposition solution 18 that is to be tested; an annular anode basket 20, suspended within the vessel 16 for containing metal fragments 22 of the metal to be electrodeposited; and, a spiral contractometer 24 having a metallic spiral substrate 26 that extends downwardly into the electrolytic solution 18. The anode basket 20 (and the metal fragements 22 within the anode basket) are electrically connected to the positive terminal of the constant current source 14 via the electrical connection 28 and the spiral substrate 26 of the contractometer 24 is connected to the negative terminal of the constant current source via the electrical connection 30. In accordance with this invention, the constant current source 14 is controlled by a timer 32 to electrodeposit a predetermined amount of metal on the exterior surface of the spiral substrate 26.

Specifically, when a particular electrolytic solution 18 is tested to determine the residual stress that will be created within electrodeposited parts that are deposited from that solution, the solution is placed within the test cell 10 and heated to the desired temperature by conventional apparatus such as a "stir plate" which not only heats the electrolytic solution 18, but also magnetically agitates the solution. When the electrolytic solution 18 is at the desired temperature, the constant current source 14 is activated by manually setting the timer 32. The timer 32 causes the current source 14 to supply a constant electrical current between the anode basket 20 and the metal spiral substrate 26 of the contractometer 24 for a predetermined period of time. Since the current supplied by the constant current source 14 is of a constant magnitude, metal is electrodeposited on the exposed outer surface of the spiral substrate 26 at a constant rate. Thus, when the timer 32 automatically deactivates the current source 14 after the predetermined test period, a predetermined amount of metal has been electrodeposited on the spiral substrate 26. As is known in the art, and as shall be described in more detail hereinafter, the residual stress within the electrodeposit formed on the spiral substrate 26 exerts a mechanical force that causes the spiral substrate to wind or unwind. This winding or unwinding action causes an angular deflection of a rod 34 (FIG. 2) that is rigidly attached to the lower end of the spiral substrate 26 and passes through the interior region of the substrate to a deflection indicator or dial 36 located on the upper portion of the contractometer 24. As shall be recognized upon understanding the present invention, the use of the constant current source 14 and the timer 32 greatly simplifies the conversion of the angular deflection of the shaft 34 to the value of residual stress within the electrodeposited metal.

The constant current source 14 and the timer 32 are conventional electrical apparatus selected to provide the desired electric current and plating period. More explicitly, the current source 14 is a conventional current source configured to supply a desired current density within the electrolytic solution 18 of the test cell 10 and the timer 32 is configured to provide the desired plating interval. For example, in the use of one embodiment of the invention for the electrodeposition of nickel from a nickel sulfamate solution, it has been found satisfactory to utilize a current of 3 amperes to establish a current density of 40 amperes per square foot within the nickel sulfamate electrolyte and to utilize a 30 minute plating interval. In most cases, when the electrolyte of a production plating bath is being tested, the current density utilized in the test operation should correspond to the current density utilized during the production process. In this respect, it can be advantageous to utilize an adjustable constant current source 14 wherein the current can be established at a desired value. Further, in embodiments wherein the testing of a variety of electrolytes for electrodepositing various metals is to be accomodated it can be advantageous to utilize a timer 32 having a selectable time period. In any case, in the practice of this invention, the mathematical product of the supplied current and the time period utilized (amperehours) is generally established to form a layer of electrodeposit on the spiral substrate 26 that is approximately 0.1 mil. in thickness (0.0025 mm). To ensure accuracy of the test operation, the ampere hours supplied by the current source 14 and the timer 32 should preferably be accurate within approximately 1% of the desired test value.

Referring to FIG. 2, the anode basket 20 is annular in shape and is dimensioned for coaxial placement within the vessel 16. Walls 38 and 40, which respectively form the inside and outside boundaries of the anode basket 20, are formed of an open mesh or woven metal material such as titanium that will not chemically react with the electrolytic solution 18. The interior and exterior peripheries of an annular plate 42 are respectively joined to the lower edges of the walls 38 and 40 so that the anode basket 20 forms an annular cavity for containing metal fragments 22 of the type of metal to be electrodeposited within the test cell 10. As is known in the art, atoms of such metal fragments are ionized during the electrodeposition process to replace those ions of the electrolytic solution 18 that form the electrodeposit on the cathode structure (e.g., spiral substrate 26 of the contractometer 24). The anode basket 20 is suspended from the rim of the vessel 16 by a series of spaced apart metal tabs 44 that project radially outward from the upper edges of the walls 38 and 40. The tabs 44 can be connected to either the wall 38 or the wall 40, or to both walls. Generally, one of the tabs 44 serves as an electrical terminal for electrically interconnecting the anode basket 20 with the positive terminal of the constant current source 14.

Figure 3:
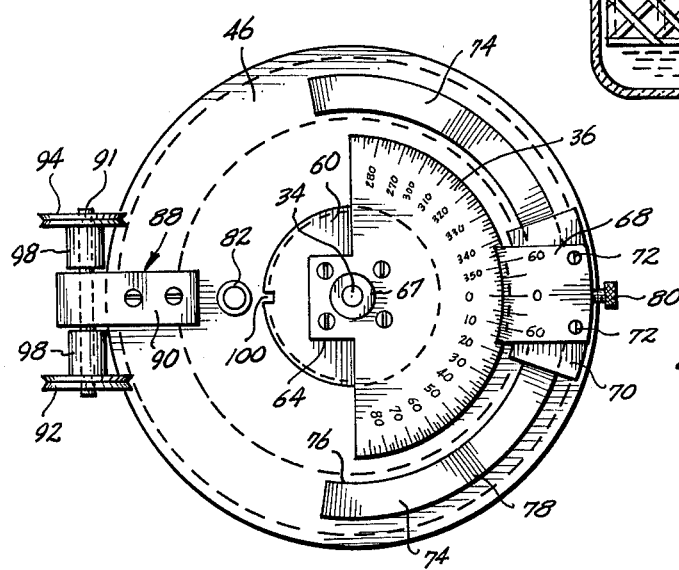
FIG. 3 is a top plan view of the contractometer of this invention depicted in FIGS. 1 and 2.

A circular support plate 46, preferably formed of a relatively inert material such as plastic, rests on the upper edges of the walls 38 and 40 to support the contractometer 24 within the vessel 16. In the depicted embodiment, the support plate 46 includes a central circular region extending downwardly from the lower surface of the support plate with the diameter of the extending circular region substantially equal to the inside diameter of the annular anode basket 20. The central region of the support plate 46 extends downwardly to form a circular boss 48 having a diameter substantially identical to the inner diameter of conventional contractometer spiral substrates. The spiral substrate 26 is attached to the circular boss 48 by a screw 50 which engages with an internally threaded opening in the boss 48. The lower end of the spiral substrate 26 is attached to a circular plug 52, which is formed of plastic or other material that does not react with the electrolyte 18, by a second screw 54 which is engaged with an internally threaded opening in the plug 52. The rod 34 is press fit in an opening that extends axially downward through the plug 52 so that any change in the radius of curvature of the spiral substrate 26 will cause the rod 34 to rotate. The upper portion of the rod 34 passes through an opening 56 that extends downwardly through the center of the support plate 46. The opening 56 is of a greater diameter than the diameter of the rod 34 with a thin annular disc 58 maintaining the rod 34 in spaced relationship with the walls of the opening 56. The annular disc 58 is mounted on the lower surface of the circular boss 48 and includes a central opening of substantially the same diameter as the rod 34. Preferably, the annular disc 58 is made of a low friction material such as a fluorocarbon (e.g., polytetrafluoride) so that the rod 34 rotates easily. A circular spool 60 having a V-shaped peripheral groove 62 is press fit to the upper portion of the shaft 34 with the lower face of the spool 60 substantially parallel to the upper surface of the upper plate 46. As shall be described in detail hereinafter, the spool 60 is utilized to calibrate the contractometer 24 whenever a new spiral substrate 26 is installed. The dial 36 extends radially outward from the shaft 34 with the lower surface of the dial 36 being in contact with the upper surface of the spool 60. As can be seen in FIG. 3, the dial 36 of the depicted embodiment is substantially semi-circular when viewed from above with a rectangular tab 64 extending outward from the central section of the dial 36. Four screws 66 fasten the dial 36 to the spool 60. The upper face of the dial 36 is calibrated in degrees of deflection and is read with the aid of a vernier plate 68 that is positionable along the arcuate edge of the dial 36. A circular hub 67, having a circular downwardly extending shoulder, is press fit to the central opening of the dial 36 and the spool 60 so that the dial 36, the spool 60, and the rod 34 are effectively a unitary structure.

When viewed from above (FIG. 3), the vernier plate 68 is shaped like a segment of an annular disc having an inner diameter approximately equal to the diameter of the dial 36. The vernier plate 68 is maintained in a position in which a graduated scale, included along the inner edge of the vernier plate 68, is supported in close proximity to the graduated arcuate edge of the dial 36. More explicitly, the upper surface of the support plate 46 includes an arcuate rail 74, having a substantially rectangular cross section, that projects upwardly from the upper surface of the support plate 46. The arcuate rail 74 includes an inner wall 76 and an outer wall 78 with the walls 76 and 78 being substantially perpendicular to the upper surface of the support plate 46. When viewed from above, the walls 76 and 78 are concentric with respect to the dial 36 with the walls 76 and 78 extending over slightly more than an angle of 180° relative to the center point of the support plate 46 (i.e., shaft 34).

In effect, the arcuate rail 74 forms a curved track for a vernier block 70 upon which the vernier plate 68 is mounted. In particular, the vernier block 70 has a substantially U-shaped cross sectional geometry wherein the vertical spaced apart legs thereof extend downwardly along the walls 76 and 78 of the arcuate rail 74. The vernier plate 64 is attached to the upper surface of the vernier block 70 by screws 72 which pass downwardly through the vernier plate 68 into the vernier block 70. A set screw 80, engaged with a threaded opening in the outermost leg of the vernier block 70, is tightened to lock the vernier block 70 and vernier plate 68 in any desired position relative to the dial 36. As shall be described in more detail hereinafter, the vernier block 70 is positioned to "zero" the dial indicator at the beginning of each electrodeposition sequence.

As can be seen in FIGS. 2 and 3, the support plate 46 includes an electrical connector 82 for interconnecting the spiral substrate to the negative electrodeposition potential (e.g., the negative terminal of the constant current source 14 of FIG. 1). In the arrangement depicted in FIGS. 2 and 3, a conventional electrical connector, commonly called a banana jack, is mounted to the support plate 46. To prevent the electrical connector 82 from contacting the electrolytic solution 18, a portion of the lower surface of the support plate 46 that immediately surrounds the electrical connector 82 includes a recess 84. An insulated conductor 86 extends between the electrical connector 82 and the spiral substrate 26. Generally, the electrical conductor 86 is clamped between the inner surface of the spiral substrate 26 and the outer wall of the boss 48 to electrically interconnect the conductor 86 with the spiral substrate 26 when the screw 50 is tightened to install the spiral substrate 26 to the upper plate 46.

A calibration mechanism 88, located on the upper plate 46, is utilized to apply a predetermined torque to the shaft 34 for determining a proportionality constant which takes into account the stiffness of the spiral substrate 26. As shall be described in more detail hereinafter, the calibration mechanism 88 is utilized each time a new spiral substrate 26 is installed to the contractometer 24. In the depicted arrangement, the support mechanism 88 includes a rectangular support arm 90 that extends radially outward along a diameter of the upper surface of the support plate 46 such that one end of the support arm extends beyond the boundary of the support plate 46. Two spaced apart pulleys 92 and 94 are mounted on a shaft 91 that passes orthogonally through the outer end of the support arm 90. The pulleys 92 and 94 are respectively spaced apart from the edges of the support arm 90 by cylindrical spacers 98 with the spacers 98 being dimensioned to establish the distance between the pulleys 92 and 94 substantially equal to the diameter of the spool 60. In addition, the support arm 90 and the pulleys 92 and 94 are dimensioned such that a horizontal plane passing through the mid point of the V-shaped groove 62 of the spool 60 is tangential to the V-shaped grooves within each pulley 92 and 94.

When it becomes necessary or desirable to mount a new spiral substrate 26 on the contractometer 24, one end of the spiral substrate 26 is inserted over the boss 48 of the upper plate 46 and the screw 50 is installed through the spiral substrate 26 so that the spiral substrate 26 extends downwardly from and substantially orthogonal to the lower surface of the support plate 46. Generally, the exposed portion of the screw 50 is coated with a material that prevents the formation of an electrodeposit on the screw 50 during the electrodeposition process. Alternatively, a small band or ring of relatively inert material (not shown) can be utilized to prevent the electrolytic solution 18 from coming into contact with the screw 50. The lower end of the spiral substrate 26 is then connected to the plug 52 with the screw 54. It can be noted that in the above-described arrangement, when the lower end of the spiral substrate 26 is connected to the plug 52, the spiral substrate 26 will not be stretched beyond its equlibrium length. That is, although the shaft 34, the spool 60, the dial 36, and the hub 67 are effectively suspended within the opening 56 of the support plate 46 by the attachment of the shaft 34 to the plug 52, the shaft and dial assembly does not significantly change the physical characteristics of the spiral substrate 26. Since in this arrangement the shaft 34 contacts only the inner diameter of the low friction annular disc 58, the stress caused by electrodeposits readily rotates the shaft 34 to produce a dial indication on the dial 36.

Turning now to the operation of the embodiment of the invention depicted in the drawing, the calibration mechanism 88 is utilized to determine the deflection constant of a particular substrate 26 when it is initially installed on the contractometer 24. To determine the deflection constant of the spiral substrate 26, the substrate is installed to the contractometer 24 as previously described and a known torque is applied to the shaft 34. More explicitly, in the practice of this invention, a string having a known weight (e.g., 1 ounce) attached to one end thereof is utilized in conjunction with the spool 60 and the calibration mechanism 88 to angularly deflect the shaft 34. Since it has been found that a conventional spiral substrate 26 exhibits a different deflection constant for compressive stress than is exhibited for tensile stress, the depicted embodiment of the invention is arranged for determining separate deflection constants to be utilized in accordance with the type of residual stress exhibited by a particular electrodeposit.

To determine the deflection constant appropriate for use when the electrodeposit exhibits a tensile stress, the known weight is suspended from the pulley 92 with the string being routed through the groove of pulley 92, through the V-shaped groove 62 of the spool 60, and connected to a notch 100 of the spool 60. Since the diameter of the spool 60 is substantially identical to the distance between the pulleys 92 and 94, the force applied by the suspended weight is substantially tangential to the spool 60. Accordingly, the torque supplied to the shaft 34 is substantially equal to the mathematical product of the known weight (W) and the radius of the spool 60 (r). With the weight so suspended from the pulley 92, the set screw 80 which retains the vernier block 70 to the vernier rail 78 is loosened, and the vernier block 70 is slid along the arcuate rail 74 to align the zero graduation of the vernier plate 68 with the zero graduation of the dial 36. The weight and string are then removed from the pulley 92 and the spool 60 to allow the spiral substrate 26 to return to the equilibrium position. As the spiral substrate 26 returns to the equilibrium position, the shaft 34 and dial 36 rotate in a counter clockwise direction. With the spiral substrate at rest in the equilibrium position, the dial 36 is utilized in conjunction with the vernier plate 68 to determine the angular deflection (D) caused by the known weight. The tensile deflection constant $K_t$ is then calculated by dividing the torque (Wr) by the angular deflection D.

The deflection constant $K_c$ for the spiral substrate 26 in situations wherein the electrodeposit exhibits a compressive stress is determined in a similar manner with the weight being suspended over the pulley 94, routed around the spool 60 in a clockwise direction, and retained in the notch 100. Both the compressive and tensile deflection constants $K_c$ and $K_t$ are recorded for a future reference during future electrodeposition tests. Since, as shall be described in the following paragraphs, the spiral substrate 26 of this invention need not be removed following each electrodeposition sequence, no further calibration need be performed until a new spiral substrate 26 is installed on the contractometer 24.

To determine the residual stress caused by electrodeposition with a particular electrolytic solution, the vessel 16 is filled with the electrolyte of interest and is heated to the desired temperature on a conventional heating apparatus. Preferably such apparatus includes means for agitating the solution to maintain the electrolyte at a relatively uniform temperature and concentration. When the spiral substrate 26 is constructed of stainless steel, the spiral substrate 26 is preferably preconditioned with a thin coating of nickel and copper to improve the adherence of the electrodeposit. As is known in the art, such a preconditioning is commonly called a strike and generally includes cleaning the helix, electrodepositing a very thin layer of nickel on the exterior surface of the spiral substrate 26, and subsequently electrodepositing a thin layer of copper on the exterior surface of the spiral substrate 26.

When the spiral substrate has been plated with a thin layer of nickel and copper, and the temperature of the electrolyte 18 has reached the desired level, the spiral contractometer 24 is placed on the vessel 16 with the spiral substrate 26 projecting centrally downward into the solution 18. As can be seen in FIG. 1, the negative electrode of the constant current source 14 is then connected to the electrical connector 82 and the anode basket 20 is electrically interconnected with the positive electrode of the constant current source 14, e.g., by an electrical connection between a support tab 44 and the positive electrode of the current source 14. When the spiral substrate 26 has reached the temperature of the solution 18, the zero graduation of the vernier plate 68 is aligned with the zero graduation of the dial 36 by loosening the set screw 80 and sliding the vernier block 70 along the arcuate rail 74. The set screw 80 is then tightened to maintain the vernier plate 68 in this position and the constant current source 14 is activated by setting the timer 32.

When the timer 32 is activated, the constant current source 14 causes a substantially uniform current density within the electrolytic solution 18 to electrodeposit metal atoms on the spiral substrate 26 at a uniform rate. At the conclusion of the predetermined time interval, the timer 32 disables the constant current source 14 to prevent the further formation of electrodeposit on the spiral substrate 26. At this point, the dial 36 is read in conjunction with the vernier plate 68 to determine the angular deflection of the shaft 34 caused by the stress within the electrodeposited metal.

The residual stress within the electrodeposit is then determined by the expression $S=K_a Dc$ where S is the stress, $K_a$ is the appropriate tensile or compressive deflection constant ($K_t$ and $K_c$ respectively), D is the indicated angular deflection of the rod 34, and $c$ is a proportionality constant equal to the quantity $2/(ptd)$ where $p$ is the pitch of the spiral substrate 26 in turns per inch, $t$ is the thickness dimension of the metal strip forming the spiral substrate 26, and $d$ is the thickness of the electrodeposit. Since the thickness of the electrodeposit $d$ is a predetermined quantity depending upon the current density established by the constant current source 14 and the time period established by the timer 32, the proportionality constant $c$ is known in advance of each electrodeposition test and the determination of the stress requires only a simply multiplication operation.

When the stress measurement has been completed, the electrodeposit is removed from the spiral substrate 26 by conventional chemical etching in an etchant suitable for removing the electrodeposit and the preconditioning layers of copper and nickel. Since the spiral substrate 26 need not be removed from the contractometer 24 for determining the thickness of the electrodeposit or for the cleaning operation, no changes take place in the mounting arrangement which could otherwise cause changes in the deflection constants $K_t$ and $K_c$. Hence, the contractometer of this invention can be utilized in subsequent electrodeposition tests without further calibration.

It should be recognized by those skilled in the art that the embodiment depicted herein is exemplary in nature and many variations can be made without departing from the scope and spirit of this invention. For example, in some situations it may be necessary or desirable to test an electrolytic solution while the solution is contained in the production electrodeposition tanks. In such a case, the current source 14 and timer 32 can be utilized to replace the production power source and the spiral contractometer 24 can be suspended directly in the production tank. Preferably, if the production tank includes agitation of the electrolytic solution by discharging air bubbles throughout the tank, a cylindrical tube or shroud is coaxially mounted around the spiral substrate 26 to prevent air bubbles from forming on the spiral substrate and disrupting the electrodeposition process. Further, it is advantageous in such an embodiment of the invention to include a shield or enclosure over the upper surface of the support plate 46 and dial 36 to protect the contractometer 24 from electrolytic solution that could be splashed upon the contractometer during the test deposition.

What is claimed is:

1. In a spiral contractometer for determining the stress within an electrodeposit wherein said spiral contractometer includes a spiral substrate suspendible in an electrolytic solution as the cathode of an electrodeposition cell, a first end of said spiral substrate being rigidly affixed to a support plate positioned above the surface of said electrolytic solution, said spiral contractometer including a rod extending downwardly through the central opening of said spiral substrate with a first end of said rod securely attached to the second end of said spiral substrate, the second end of said rod projecting upwardly through an opening in said support plate, the improvement comprising:

a vernier dial indicator directly connected to said second end of said rod projecting through said support plate, said vernier dial indicator including at least a segment of a disk having graduations along the curved periphery thereof and a graduated plate slidably mounted to said support plate, said graduated plate movable along the curved periphery of said disk and securable to said support plate in a selected orientation with said graduations of said disk, said rod supported solely by said attachment between said first end of said rod and said second end of said spiral substrate.

2. The improvement of claim 1 further comprising a circular plug having a downwardly extending circular opening in the center thereof for affixing said first end of said rod to said second end of said spiral substrate, said rod being press fit to said circular opening of said plug and extending substantially perpendicular to a first planar surface of said plug, said plug having a diameter substantially identical to the inside diameter of said spiral substrate for inserting said plug within the interior region of said spiral substrate at said second end thereof, said plug and said spiral substrate each having at least one opening alignable with one another when said plug is inserted in said spiral substrate, said improvement further including fastener means insertable in said aligned openings of said plug and said spiral substrate for affixing said second end of said spiral substrate to said plug.

3. The improvement of claim 1 wherein said opening of said support plate is of a diameter greater than the diameter of said rod and said improvement further comprises an annular disc mounted on the lower surface of said support plate, said annular disc having a central opening substantially identical to the diameter of said rod, said rod passing through said central opening of said annular disc, said annular disc being mounted to said lower surface of said support plate in a position that maintains said rod in spaced relationship with the boundaries of said opening of said support plate.

4. The improvement of claim 1 further comprising a calibration mechanism mounted on said upper surface of said support plate for determining a first and second proportionality constant useful in converting a dial indication supplied by said vernier dial indicator when said rod is rotated by internal stress with an electrodeposit formed on said spiral substrate, said calibration mechanism including means for supplying a first predetermined torque to rotate said rod in a first direction and means for supplying a second predetermined torque to rotate said rod in a second direction, said first proportionality constant being numerically equal to said first predetermined torque divided by the angular rotation of said rod caused by said first predetermined torque, said second proportionality constant being numerically equal to said second predetermined torque divided by the angular rotation of said shaft caused by said second predetermined torque.

5. The improvement of claim 4 wherein said calibration mechanism includes a circular spool concentrically mounted to said rod and first and second spaced apart pulleys, said spool mounted to said rod at a position above the upper surface of said support plate with the planar surfaces of said spool substantially perpendicular to said rod, said spool having a notch located in the periphery thereof, said first and second pulleys being spaced apart by a distance substantially equal to the diameter of said circular spool, said pulleys being mounted to extend beyond the boundary of said support plate with said pulleys rotatable about an axis substantially orthogonal to and spaced apart from said rod, said first torque being supplied to said rod by suspending a predetermined weight from said first pulley, said weight connected to said notch of said spool to rotate said rod in said first direction, said second torque being supplied to said rod by suspending said predetermined weight from said second pulley with said weight connected to said notch of said spool.

6. Apparatus for determining the stress within an electrodeposit formed from an electrolytic solution wherein said electrolytic solution is the electrolyte of a galvanic cell including an anode structure of the type of metal deposited on the cathode structure of said galvanic cell, said apparatus comprising:

current source means responsive to an applied timing signal for supplying a predetermined constant current for a predetermined period of time, said current source means supplying said predetermined constant current for a period of time substantially equal to the time duration of said applied timing signal, said current source means having a positive electrode electrically connectable to said anode structure of said galvanic cell and a negative electrode electrically connectable to said cathode structure of said galvanic cell;

timing means connected to said current source means for supplying said timing signal to said current source means;

spiral contractometer means suspendable in said electrolytic solution as said cathode structure, said spiral contractometer means including a metallic spiral substrate, an upper support plate, a dial indicator and a rod for interconnecting one end of said spiral substrate with said dial indicator, said spiral substrate being mounted to said support plate to project downwardly into said electrolytic solution when said spiral contractometer means is suspended in said electrolytic solution, a first end of said spiral substrate being affixed to said support plate, said rod being positioned to pass upwardly through the interior region of said spiral substrate with a first end of said rod structurally connected to the second end of said spiral substrate, said rod passing upwardly through said support plate, said dial indicator being directly affixed to the second end of said rod to supply an indication of angular rotation when said spiral substrate winds or unwinds, said rod and said dial indicator being supported in the vertical direction solely by said structural connection of said first end of said rod with said second end of said spiral substrate, said spiral substrate being electrically connectable as said cathode structure of said galvanic cell.

7. The apparatus of claim 6 wherein said dial indicator includes at least a segment of a circular disc having graduations along the curved periphery thereof and a vernier indicator mounted in spaced juxtaposition with said curved periphery of said segment of said circular disc.

8. The apparatus of claim 7 wherein said vernier indicator is mounted for movement along an arcuate path in spaced juxtaposition with said curved periphery of said circular disc of said dial indicator.

9. The apparatus of claim 8 further comprising means for calibrating said spiral contractometer means to determine a first deflection constant of said spiral substrate and a second deflection constant of said spiral substrate, said first and second deflection constants being respectively equal to the torque required to cause said rod to rotate one unit of angular deflection in first and second directions of rotation, said calibration means including a circular spool having a V-shaped groove about the periphery thereof and a notch positioned at a predetermined point along said V-shaped groove, and first and second spaced apart pulleys mounted to said support plate for rotation about an axis substantially perpendicular to and spaced apart from said rod, said circular spool affixed to said rod with the planar surfaces of said spool substantially perpendicular to said rod, said pulleys being parallel to one another and being spaced apart from one another by a distance substantially equal to the diameter of said spool, said pulleys being positioned relative to said spool such that said V-shaped groove of said spool is colinear with a predetermined point on the periphery of said first and second pulley, said predetermined point lying on a line through the axis of rotation of said first and second pulleys that is substantially parallel to said rod.

* * * * *